US011312493B2

(12) United States Patent
Nord et al.

(10) Patent No.: US 11,312,493 B2
(45) Date of Patent: Apr. 26, 2022

(54) UNMANNED AERIAL VEHICLE WITH NON-LETHAL NEUROMUSCULAR INCAPACITATION SYSTEM

(71) Applicant: ALBALUX, LLC, Evansville, IN (US)

(72) Inventors: Jon Nord, Evansville, IN (US); Craig Kendall, Evansville, IN (US)

(73) Assignee: ALBALUX, LLC, Evansville, IN (US)

( * ) Notice: Subject to any disclaimer, the term of this patent is extended or adjusted under 35 U.S.C. 154(b) by 0 days.

(21) Appl. No.: 16/669,146

(22) Filed: Oct. 30, 2019

(65) Prior Publication Data

US 2020/0130834 A1  Apr. 30, 2020

Related U.S. Application Data

(60) Provisional application No. 62/752,441, filed on Oct. 30, 2018.

(51) Int. Cl.
*B64C 39/02* (2006.01)
*F41H 13/00* (2006.01)
*B64D 7/00* (2006.01)

(52) U.S. Cl.
CPC .............. *B64D 7/00* (2013.01); *B64C 39/024* (2013.01); *F41H 13/0025* (2013.01); *B64C 2201/027* (2013.01); *B64C 2201/121* (2013.01)

(58) Field of Classification Search
CPC ...... F41A 19/18; F41A 19/183; F41A 19/186; F41A 19/19; F41A 19/68; F41A 19/69; B64D 7/00; B64C 39/024; F41H 13/0025

(Continued)

(56) References Cited

U.S. PATENT DOCUMENTS 2,737,853 A * 3/1956 Gravenhorst et al. ... B64D 7/00
89/37.17
6,359,835 B1  3/2002 Gayl
(Continued)

FOREIGN PATENT DOCUMENTS

DE  102017002156 A1 * 9/2018 ........... B64C 39/024
WO  WO-2017200456 A1 * 11/2017 ............. F41H 11/02
WO  WO-2020162997 A2 * 8/2020 ......... F41H 13/0025

*Primary Examiner* — Reginald S Tillman, Jr.
(74) *Attorney, Agent, or Firm* — Martin IP Law Group; C. Richard Martin

(57) ABSTRACT

The present invention provides an unmanned aerial vehicle with non-lethal neuromuscular incapacitation system comprising a body, a plurality of rotary assemblies secured to the body and configured to provide lift, a control system disposed within the body, and a telescoping stinger assembly mounted on the body. The telescoping stinger assembly comprises an elongated projectile having a barb at a first end thereof, a wire having a first end attached to a second end of the elongated projectile, a high voltage pulse power supply attached to a second end of the wire, and firing mechanism for launching the projectile from the telescoping stinger assembly toward a target. A protective cage may be attached to and surround the body of the UAV. The non-lethal incapacitation mechanism may include a plurality of stinging stickers attached to a periphery of the protective cage, a RF power supply and RF transmitter attached to the body of the unmanned aerial vehicle, or a mechanism affixed to the body of the unmanned aerial vehicle for discharging a liquid or powder substance at a target. Alternatively, a rotary sting arm may be affixed to the body by a rotary brush high-voltage connection; and a sting arm motor mounted proximate to a center of the body may be used to impart rotary motion to the rotary sting arm.

11 Claims, 7 Drawing Sheets

(58) Field of Classification Search
USPC .......................... 89/1.56, 28.05, 28.1, 37.16
See application file for complete search history.

(56) References Cited

U.S. PATENT DOCUMENTS

| | | | |
|---|---|---|---|
| 7,522,473 B2 | 4/2009 | Zlotnik et al. | |
| 7,640,839 B2* | 1/2010 | McNulty, Jr. | H05C 1/06 |
| | | | 89/1.11 |
| 7,950,329 B1* | 5/2011 | Nemtyshkin | F42B 5/02 |
| | | | 102/430 |
| 8,757,039 B2 | 6/2014 | Martinez et al. | |
| 9,494,936 B2* | 11/2016 | Kerzner | G08B 13/19697 |
| 9,664,482 B1 | 5/2017 | Boland | |
| 10,106,277 B2 | 10/2018 | Neely | |
| 10,155,587 B1 | 12/2018 | Tang | |
| 2006/0256559 A1 | 11/2006 | Bitar | |
| 2010/0279649 A1 | 11/2010 | Thomas | |
| 2016/0280359 A1* | 9/2016 | Semke | B64C 27/10 |
| 2016/0304217 A1 | 10/2016 | Fisher et al. | |
| 2018/0118336 A1 | 5/2018 | Drennan et al. | |
| 2018/0170510 A1 | 6/2018 | Brock | |
| 2018/0187999 A1 | 7/2018 | Tremblay et al. | |
| 2018/0245890 A1 | 8/2018 | Allen | |
| 2018/0327091 A1 | 11/2018 | Burks et al. | |
| 2020/0027326 A1* | 1/2020 | Ravat | G08B 13/196 |

* cited by examiner

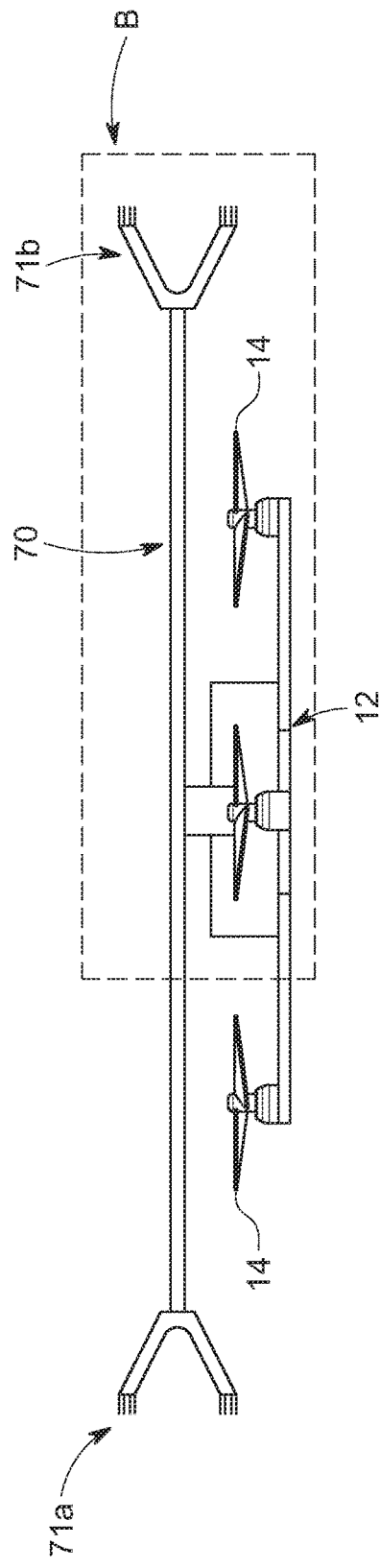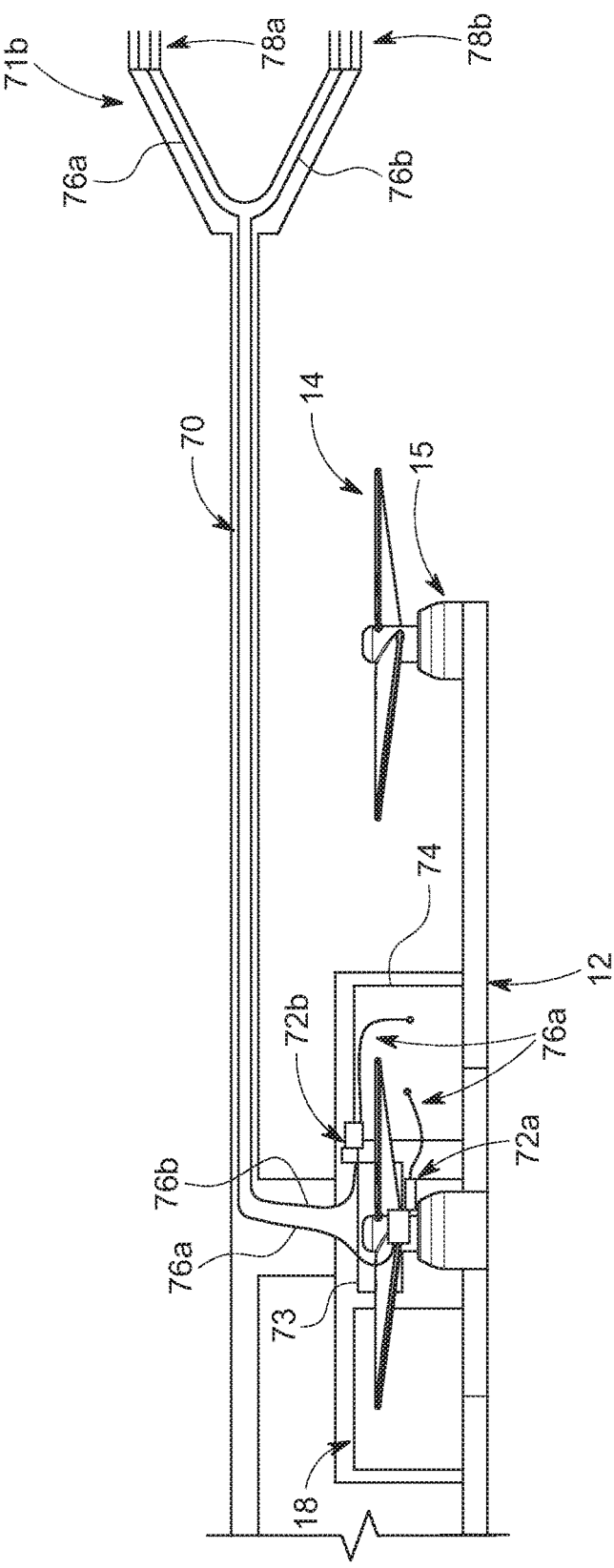

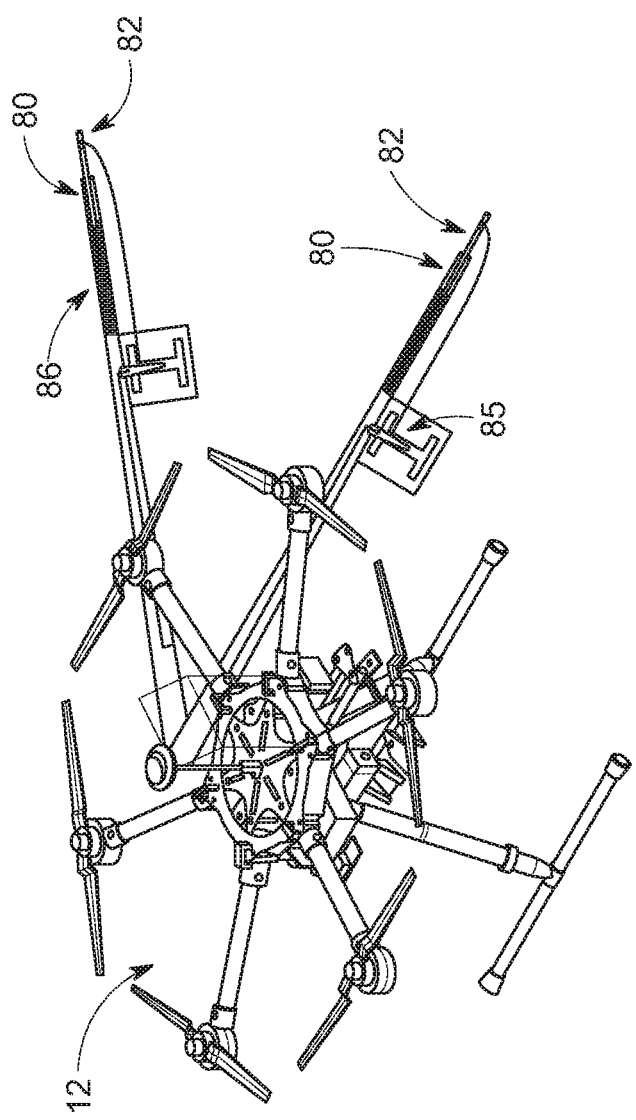
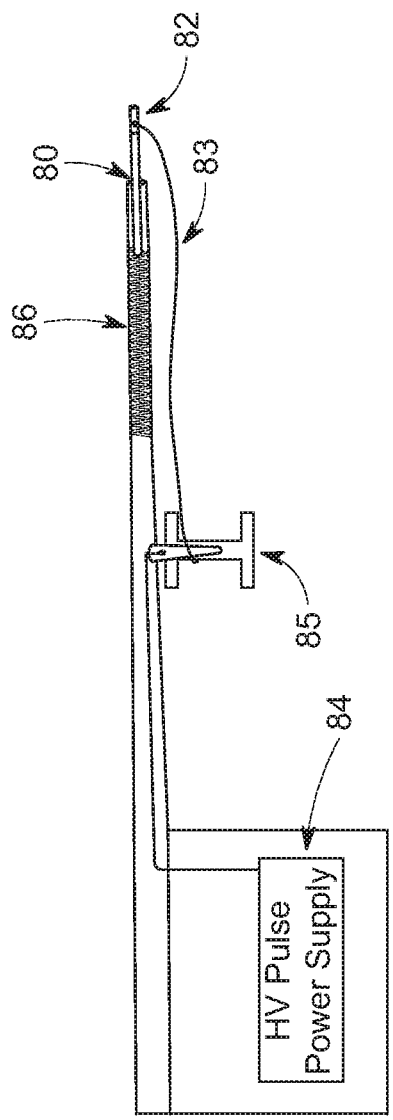
FIG. 5A
FIG. 5B

UNMANNED AERIAL VEHICLE WITH NON-LETHAL NEUROMUSCULAR INCAPACITATION SYSTEM

CROSS-REFERENCE TO RELATED APPLICATIONS

Applicant claims priority to provisional U.S. Patent Application No. 62/752,411 filed on Oct. 30, 2018.

BACKGROUND OF THE INVENTION

Field of the Invention

The present invention relates to unmanned aerial vehicles. More specifically, the present invention relates to an unmanned aerial vehicle with a non-lethal neuromuscular incapacitation system that delivers an electric pulse, mace, marking dye or other non-lethal device to incapacitate a person.

Description of the Related Art

In recent years, unmanned aerial vehicles (UAVs), more commonly known as drones, have been used by law enforcement agencies for a number of specialized purposes including search and rescue operations, traffic collision reconstruction, crime scene analysis, general surveillance and crowd monitoring. UAVs have also been used by law enforcement officers to investigate suspects and locate active shooters that are believed to be "armed and dangerous" while maintaining a safe distance. While this gives officers real-time, actionable intelligence to use to assess the threat and formulate a strategy to respond, it still requires officers to be put into harm's way to diffuse the situation and subdue the shooter.

Accordingly, there is a need for an unmanned aerial vehicle that carries with it a non-lethal neuromuscular incapacitation system that is capable of not only providing officers with intel to assess the threat, but the tools to diffuse the threat without putting officers in harm's way.

SUMMARY OF THE INVENTION

It is therefore an objective of the present invention to provide an unmanned aerial vehicle that carries a non-lethal neuromuscular incapacitation system that is capable of being deployed remotely by officers via a handheld remote control.

The present invention meets this objective by providing an unmanned aerial vehicle that carries an on-board non-lethal incapacitation system. According to one aspect of the invention, a cage surrounds the UAV and a plurality of metal barbs that are connected to a high-voltage pulse supply are carried on the cage and configured to deliver an electrical stun to a person when the metal barbs come into contact with the skin of the target person. Yet another aspect of the invention is a UAV that includes a RF power supply and transmitter system capable of transmitting a narrow beam of electromagnetic energy to heat the skin of the target causing incapacitating pain without causing any permanent damage. A third aspect of the invention is a UAV that is capable of spraying a liquid or powder such as an electrically charged stinging liquid in a mist, mace or a marking dye that will incapacitate or illuminate the target person. A further aspect of the invention is a UAV with an additional rotating element that has electrically charged stingers on the tips thereof that deliver a stunning charge to the target when they come in contact with the target's skin. Yet another aspect of the invention provides a telescoping stinger that can be fired at the subject and, through a connected wire, deliver an electrical shock to the subject when it comes in contact with the subject's body.

According to one presently preferred embodiment of the invention, there is provided an unmanned aerial vehicle with non-lethal neuromuscular incapacitation system comprising a body; a plurality of rotary assemblies secured to the body and configured to provide lift; a control system disposed within the body; and a telescoping stinger assembly mounted on the body. The telescoping stinger assembly comprises an elongated projectile having a barb at a first end thereof; a wire having a first end attached to a second end of the elongated projectile; a high voltage pulse power supply attached to a second end of the wire; and firing means for launching the projectile from the telescoping stinger assembly toward a target.

The telescoping stinger assembly may further include a spool about which the wire is removably wound. The spool may be rotatably mounted on the telescoping stinger assembly.

The firing means may further include a barrel having a spring located therein and a locking mechanism. The elongated projectile may be configured for insertion into the barrel into engagement with the spring to compress the spring, and the lock releasably engaging the elongated projectile. The firing means may further include a trigger mechanism attached to the lock to release the connection between the lock and the elongated projectile upon actuation. The spool may bee rotatably mounted on the barrel of the telescoping stinger assembly.

Alternatively, the firing means may include a barrel into which the elongated projectile is inserted, an air compressor for delivering a burst of compressed air into a first end of the barrel through a valve disposed between the air compressor and the barrel, and a valve controller for opening and closing the valve. The spool may be rotatably mounted on the barrel of the telescoping stinger assembly. A plurality of barrels, elongated projectiles, wires, spools and valves may be provided.

According to an alternative preferred embodiment of the invention, there is provided an unmanned aerial vehicle with non-lethal neuromuscular incapacitation system comprising a body; a plurality of rotary assemblies secured to the body and configured to provide lift; a control system disposed within the body; a protective cage attached to the body and surrounding the body and the plurality of rotary assemblies; and nonlethal incapacitation means attached to the protective cage. The protective cage may be attached to the body by a plurality of leaf springs, and it may be spherically shaped.

The nonlethal incapacitation means may comprise a plurality of stinging stickers attached to a periphery of the protective cage. Each of the stinging stickers may include a plurality of metal barbs projecting outwardly from the stinging sticker and the protective cage. The metal barbs may be electrically coupled to a high voltage pulse supply affixed to the body of the unmanned aerial vehicle. Further, the plurality of stinging stickers may comprise a plurality of positively charged stinging stickers, the metal barbs of which are electrically coupled to a positive terminal of the high voltage pulse supply, and a plurality of negatively charged stinging stickers, the metal barbs of which are electrically coupled to a negative terminal of the high voltage pulse supply. The plurality of negatively charged stinging stickers may be alternatively placed on the protective cage between and adjacent to corresponding positively charged stinging stickers. The metal barbs of the negative stinging stickers may be located in a central area surrounded by a surface with an adhesive thereon.

According to a further aspect of the invention, the non-lethal incapacitation means may comprise a RF power supply and RF transmitter attached to the body of the unmanned aerial vehicle. The RF transmitter may be capable of transmitting a narrow beam of electromagnetic energy.

According to a yet further aspect of the invention, the nonlethal incapacitation means may comprise a mechanism affixed to the body of the unmanned aerial vehicle for discharging a liquid or powder substance at a target. The liquid/powder discharging mechanism may comprise a reservoir affixed to the body of the unmanned aerial vehicle for holding a liquid or a powder to be discharged; a pump having an inlet attached to the reservoir to draw the liquid or powder from the reservoir; a tube having an inlet end attached to an outlet of the pump and an outlet end positioned at a periphery of the protective cage to discharge the liquid or powder at the target. Two liquid/powder discharging mechanisms may be provided, and the nonlethal incapacitation means may further comprise a high voltage power supply having a positive post connected by a first lead wire to the tube of the first liquid/powder discharging mechanism and a negative post connected by a second lead wire to the tube of the second liquid/powder discharging mechanism. The tubes may be formed from an electrically conductive material and the liquid or powder may be capable of conducting electricity.

According to yet another alternative preferred embodiment of the invention, there is provided an unmanned aerial vehicle with non-lethal neuromuscular incapacitation system comprising a body; a plurality of rotary assemblies secured to the body and configured to provide lift; a control system disposed within the body; a rotary sting arm affixed to the body by a rotary brush high-voltage connection; and a sting arm motor mounted proximate to a center of the body for imparting rotary motion to the rotary sting arm. The stinger element may be provided at each end of the rotary stinging arm.

Each of the stinger elements may be electrically coupled to a high voltage power supply positioned on the body through the rotary brush high-voltage connection.

These and other objects, features and advantages of the present invention will become apparent from a review of the following drawings and detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which:

FIG. 4A is a side plan view of an unmanned aerial vehicle with a non-lethal neuromuscular incapacitation system according to a fourth presently preferred embodiment of the invention.

FIG. 4B is a close-up view of the portion of FIG. 4A bounded by the box B.

FIG. 5A is a top plan view of an unmanned aerial vehicle with a non-lethal neuromuscular incapacitation system according to a fifth presently preferred embodiment of the invention.

FIG. 5B is a close-up view of the telescoping stinger of the unmanned aerial vehicle with a non-lethal neuromuscular incapacitation system shown in FIG. 5A.

DETAILED DESCRIPTION OF THE INVENTION

Figure 1:
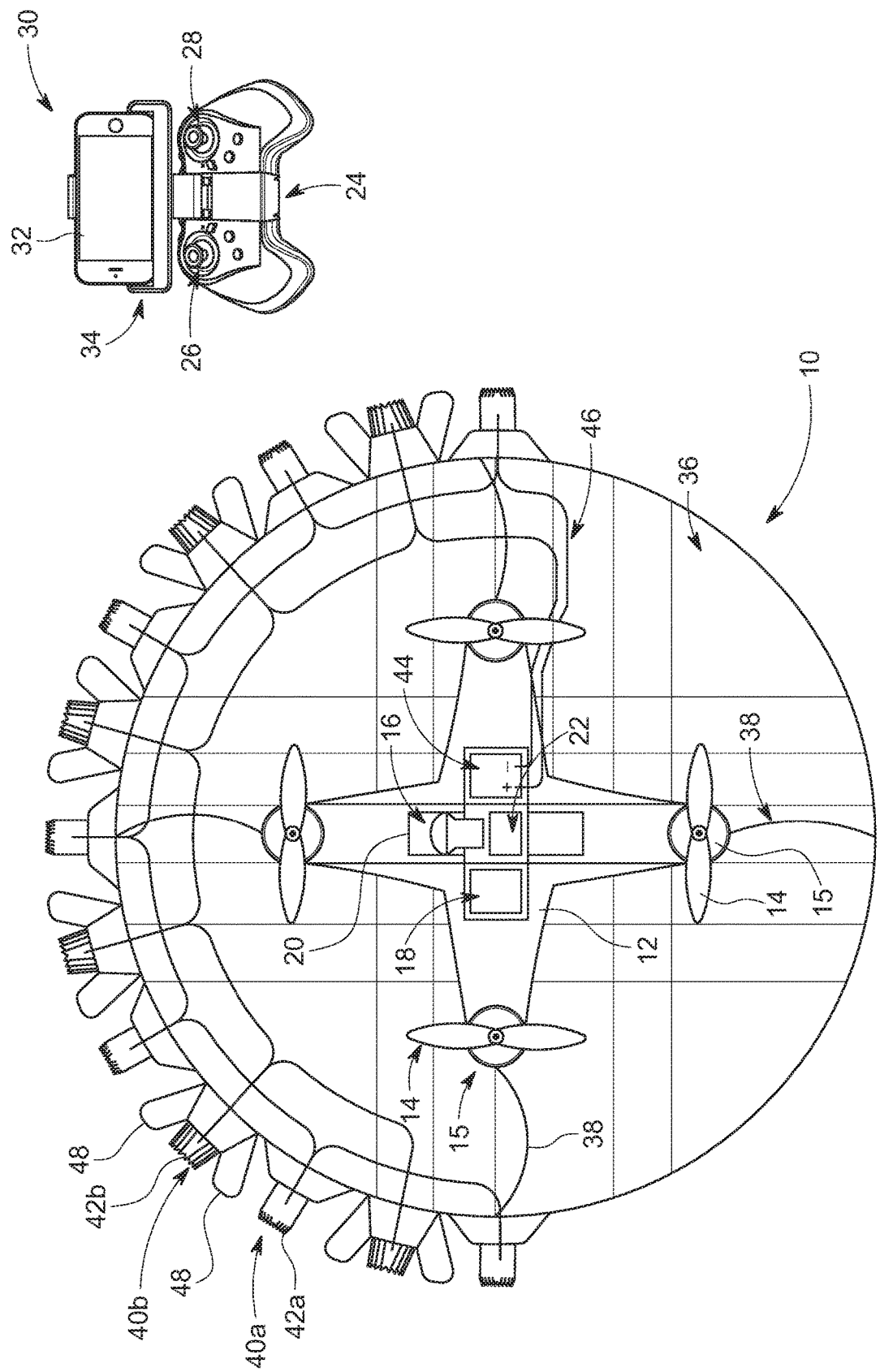
FIG. 1 is a top plan view of an unmanned aerial vehicle with a non-lethal neuromuscular incapacitation system according to a first presently preferred embodiment of the invention.

For purposes of promoting and understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

As best shown in FIG. 1, one presently preferred embodiment of the invention comprises an unmanned aerial vehicle (UAV) 10 having a body 12 and a plurality of propellers 14 driven by a corresponding plurality of electric motors 15 as are commonly known in the art for aerial propulsion. The UAV further includes an onboard video camera 16, onboard flight control electronics 18, an onboard power source such as a battery 20, all of which are coupled to a radio control and video transmitter 22 that communicates wirelessly with a handheld remote control unit 24 that is held by the operator. The handheld remote control unit 24 includes a speed control mechanism 26 and a direction control mechanism 28. A first person view (FPV) unit 30 is also provided which, in conjunction with the onboard video camera 16 radio control and video transmitter 22 displays the images from the onboard camera 16 on a liquid crystal display (LCD) 32 located on the FPV unit 30. A strap 34 may also be provided to tether the FPV unit 30 to the operator. The battery 20 powers the electric motors 15 coupled to the propellers 14 as well as the camera 16 and flight control electronics 18.

A protective cage 36 surrounds the UAV 10 and is attached to the UAV body 12 by a plurality of connectors such as leaf springs 38 having a first end attached to the protective cage 36 and a second end attached to the UAV body 12. The protective cage 36 is preferably formed of a plurality of criss-crossed wires that surround the UAV body 12, but can consist of any configuration that surrounds the UAV body 12 and propellers 14 providing a protective cage. Preferably, the cage 36 is spherical or ball-shaped, although other shapes are certainly contemplated.

A plurality of stinging stickers 40 are attached to the periphery of the cage 36. Each of the stinging stickers 40 includes a plurality of metal hooks or barbs 42 that, when they come into contact with an object such as human skin, engage and penetrate the surface of the skin. Although numerous configurations of stinging stickers could be used, FIG. 1 depicts two different types of stinging stickers 40*a*, 40*b*, shown in FIG. 1 in a alternating pattern. The first type of stinging sticker 40*a* includes a plurality of metal hooks or barbs 42*a* that are electrically coupled to the positive terminal of a power source 44, while the plurality of metal hooks or barbs 42*b* on the second type of stinging sticker 40*b* are electrically coupled to the negative terminal of the power source 44 such that, when activated, an arc of electricity is generated between adjacent stinging stickers 40*a*, 40*b*. The stinging stickers 40*a*, 40*b* are activated when the barbs 42*a*, 42*b* are in close proximity to the target person such that the arc of electricity delivers a charge to the suspect once the barbs 42*a*, 42*b* are in close proximity to the skin of the target. The plurality of metal barbs 42*a* are electrically coupled to the positive terminal of a high voltage pulse supply 44 that is carried on the UAV body 12 via electrical leads 46. A plurality of stinging stickers 40*a* may be provided and connected in series as shown in FIG. 1. The second type of stinging strikers 40*b* include a plurality of metal hooks or barbs 42*b* located in a central area surrounded by a surface with an adhesive thereon.

Figure 2:
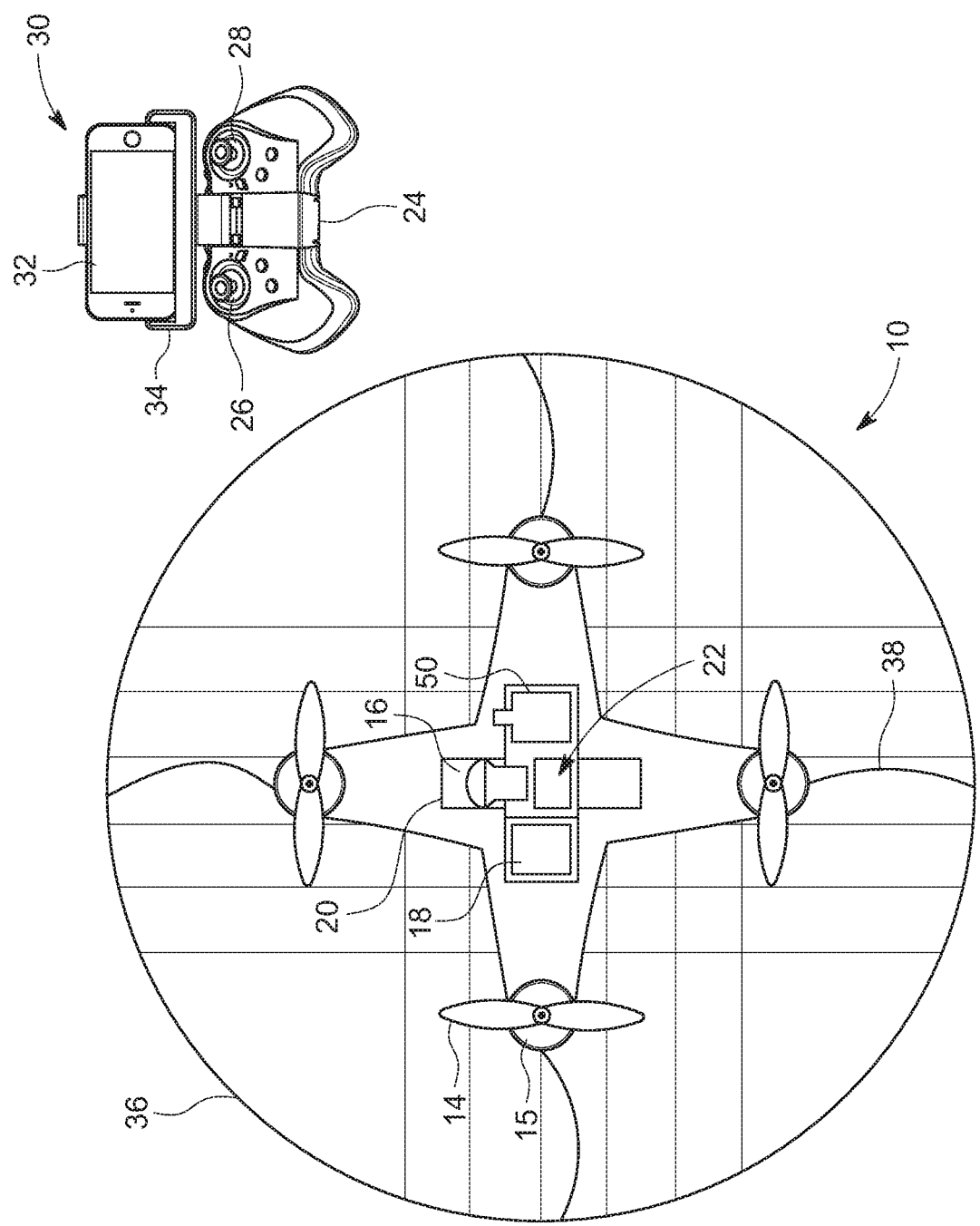
FIG. 2 is a top plan view of an unmanned aerial vehicle with a non-lethal neuromuscular incapacitation system according to a second presently preferred embodiment of the invention.

An alternative embodiment of the present invention is shown in FIG. 2. Many of the components of the UAV 10 are the same or similar to those in the first embodiment and like reference numerals are used here to indicate like component parts. The UAV according to the second embodiment includes a RF power supply and RF transmitter 50 that is capable of transmitting a narrow beam of electromagnetic energy to heat the skin without causing any permanent damage. The beam is sent out at the speed of light by the transmitter. An intense burning sensation continues until the transmitter is turned off or the targeted individual moves outside of the beam's range.

Figures 3A, 3B:
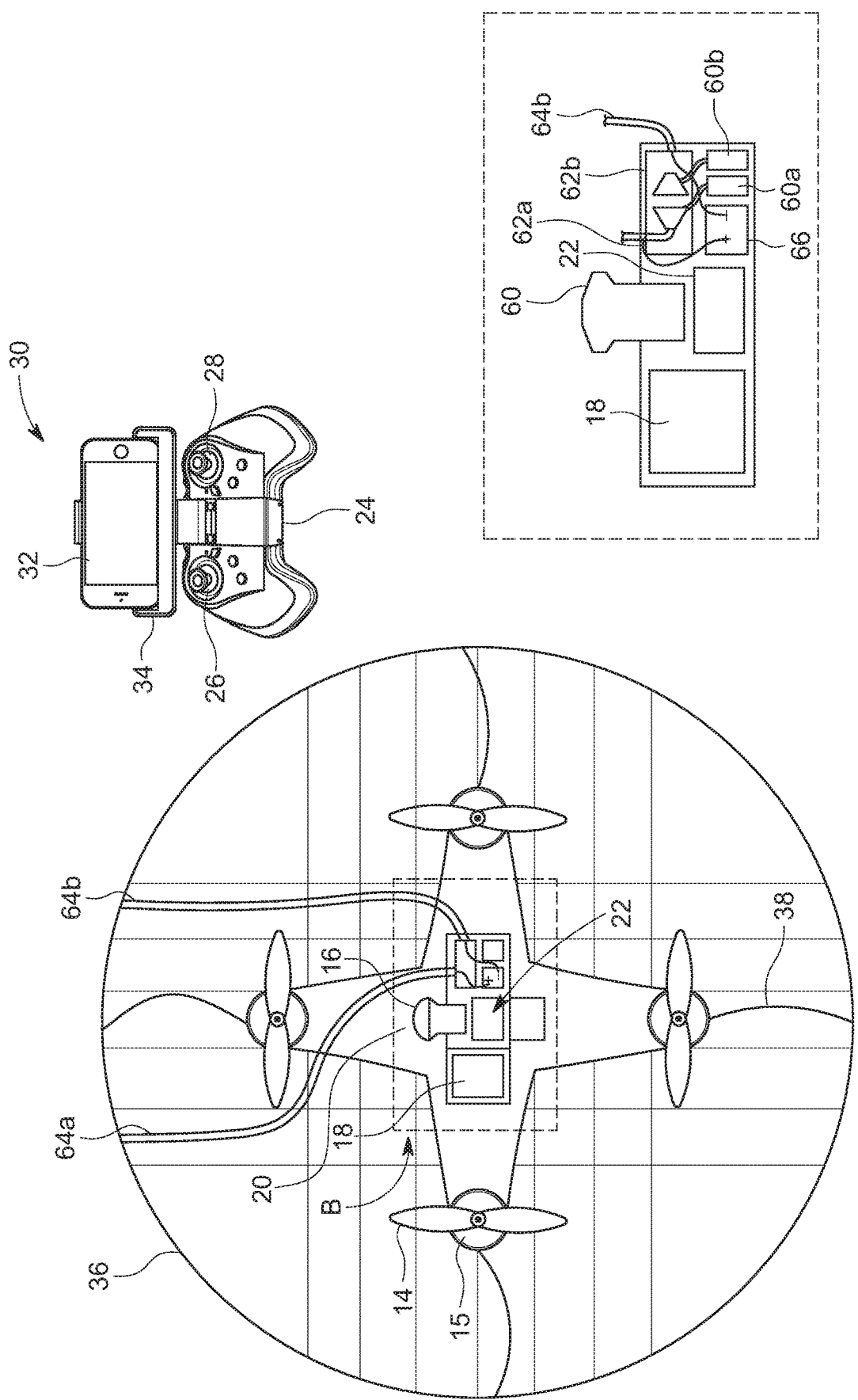
FIG. 3A is a top plan view of an unmanned aerial vehicle with a non-lethal neuromuscular incapacitation system according to a third presently preferred embodiment of the invention.
FIG. 3B is a close-up view of the portion of FIG. 3A bounded by the box B.

A further alternative embodiment of the invention is shown in FIG. 3A and FIG. 3B. Again, many of the components of the UAV 10 are the same or similar to those in the previous embodiments and like reference numerals are used here to indicate like component parts. The UAV according to the third embodiment includes a mechanism for discharging a liquid or powder substance at the target. The liquid/powder discharging mechanism includes one or more reservoirs 60*a*, 60*b* for holding the liquid or powder to be discharged. A pump 62*a*, 62*b* is associated with each reservoir 60*a*, 60*b* to draw the liquid or powder from the reservoirs 60*a*, 60*b* and direct it into tubes 64*a*, 64*b*. The free ends of tubes 64*a*, 64*b* are positioned at the periphery of the cage 36 to discharge the liquid or powder at the target when the UAV is in close proximity. Power is provided to power the pumps 62*a*, 62*b* by the main battery 20. A high voltage power supply 66 has a positive post connected by a lead wire to the first tube 64*a* and a a negative post connected by a lead wire to the second tube 64*b*. The first and second tubes 64*a*, 64*b* are preferably formed from an electrically conductive material such that when the stinging liquid is discharged from the end of the tubes 64*a*, 64*b* it forms a mist which become electrically charged upon actuation of the high voltage power source via electricity passing through the electrically conductive tubes 64*a*, 64*b* and the mist which spans the area around the free ends of the tubes 64*a*, 64*b*.

According to one aspect of the third embodiment, the liquid used is a stinging liquid and the liquid reservoirs are conductive liquid reservoirs, one being positively charged and the other negatively charged. Alternatively, the liquid reservoirs could contain mace. Still further, a marking dye could be contained in the reservoirs such that an ultraviolet or colored dye is discharged from the ends of the tubes 64*a*, 64*b*.

Figure 4C:
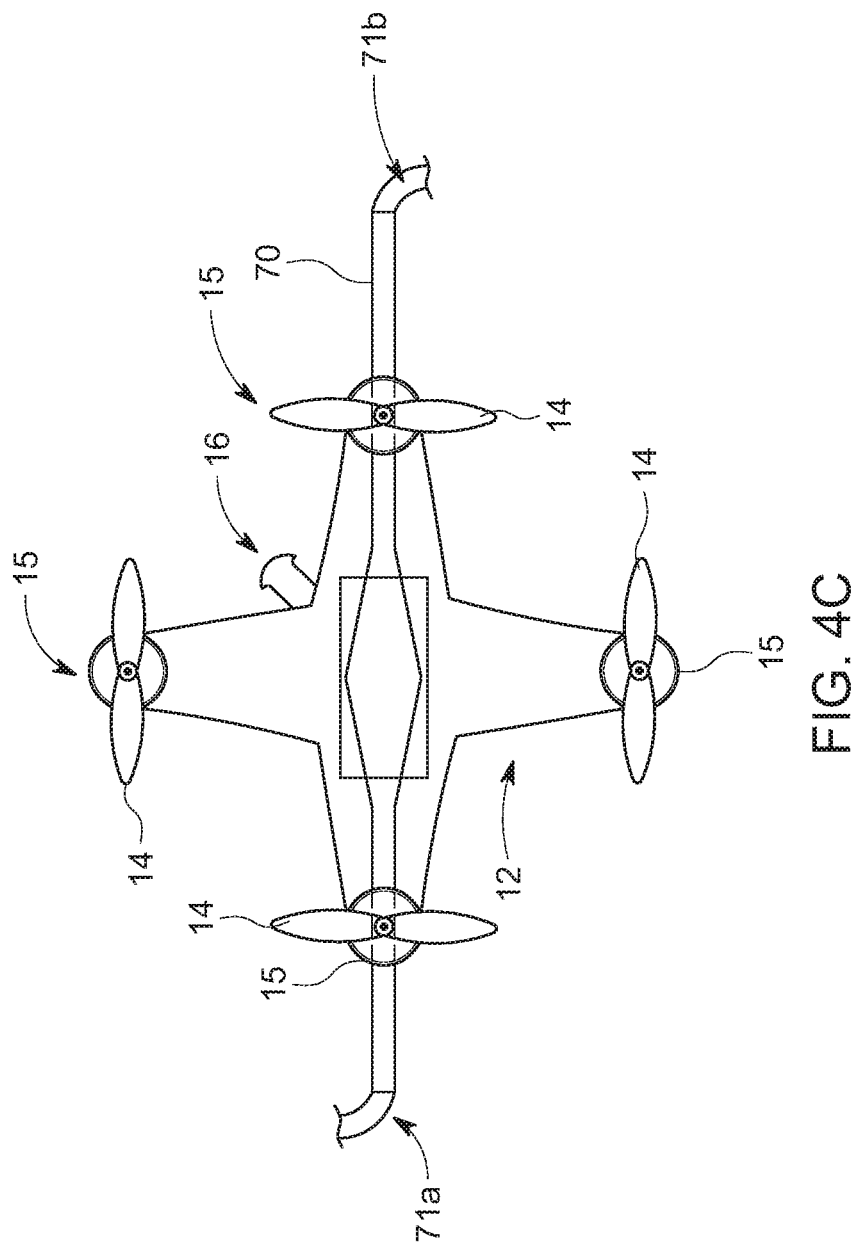
FIG. 4C is a top plan view of the unmanned aerial vehicle with a non-lethal neuromuscular incapacitation system shown in FIG. 4A.

A fourth embodiment of the present invention, as shown in FIGS. 4A-4C, includes a rotary sting arm 70 connected to the UAV body 12 by a rotary brush high-voltage connection 72 and powered by a sting arm motor 73 mounted at or near the center of the UAV body 12. The main components of the UAV 10 are the same as in previous embodiments were like reference numerals indicate like components. Each end of the rotary stinging arm 70 has a stinger element 71*a*, 71*b* that is configured to deliver a stinging charge when it comes into contact with the skin of a target. A high voltage power supply 74 positioned on the UAV body 12 supplies power to the stinger elements 71*a*, 71*b*. A first lead wire 76*a* has a first end attached to a positive post of the high voltage power supply 74 while a second lead wire 76*b* has a first end attached to a negative post of the high voltage power supply. The lead wires 76*a*, 76*b* are connected to electrical contacts 72*a*, 72*b* that are a part of the rotary brush high-voltage connection 72 so that power can be delivered to the stinger elements while the rotary sting arm 70 is in rotary motion without the lead wires 76*a*, 76*b* becoming entangled. The distal end of the lead wires 76*a*, 76*b* are connected to stinging barbs 78*a*, 78*b*, respectively, that are positioned at the outer ends of the stinger elements 71*a*, 71*b*.

A fifth embodiment of the present invention, shown in FIGS. 5A-5B, includes a telescoping stinger 80 that can be fired at a target within range of the UAV body 12. The telescoping stinger 80 may be equipped with an electrode barb 82 at the end thereof which is connected by a wire 83 to a high voltage pulse power supply 84. A spool 85 may also be provided about which the wire 83 can be wound, and, subsequently unwound as the telescoping stinger 80 with the end of the wire 83 attached is fired at and moves toward the target. The telescoping stinger in inserted into a barrel that has a spring 86 located therein. The stinger 80 compresses the spring 86 and locks the stinger 80 into position with the spring 86 compressed. When the user actuates a trigger switch (not shown) on the handheld remote control unit 24, the spring 86 is released and the stinger 80 fired toward the target.

Figure 5C:
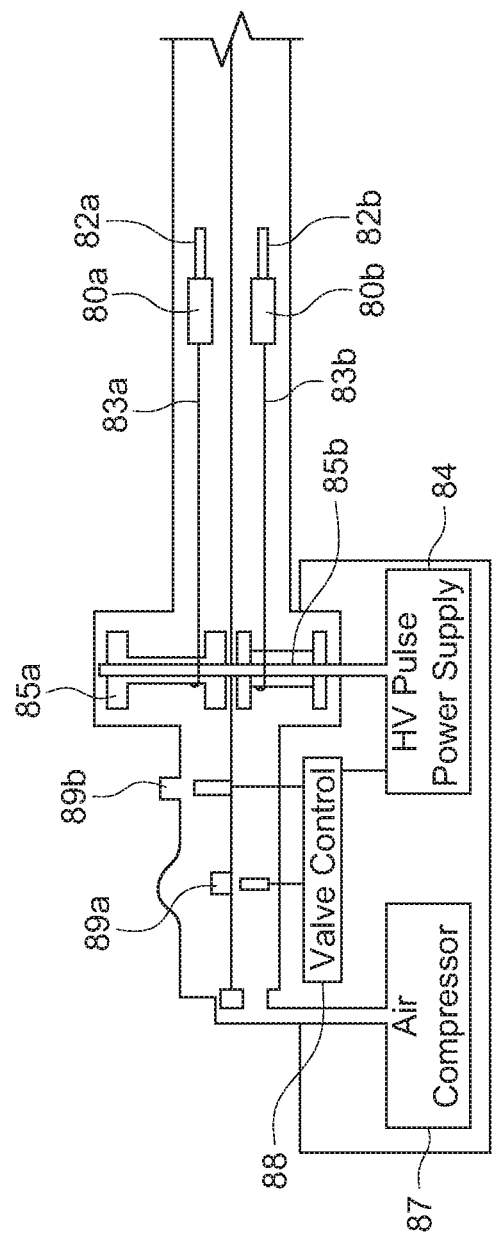
FIG. 5C is a close-up view of an alternative configuration of the telescoping stinger of the unmanned aerial vehicle with a non-lethal neuromuscular incapacitation system shown in FIG. 5A.

FIG. 5C shows an alternative firing mechanism for the fifth embodiment wherein a pair of telescoping stingers 80*a*, 80*b* having electrode barbs 82*a*, 82*b*, respectively, are loaded into barrels and have electrical lead wires 83*a*, 83*b* which connect them to a high pulse power supply 84. Spools 85*a*, 85*b* may also be provided about which the wires 83*a*, 83*b* can be wound, and, subsequently unwound as the telescoping stingers 80*a*, 80*b* with the end of the wires 83*a*, 83*b* attached are fired at and move toward the target. An air compressor 87 and valve controller 88 serve to open and close valves 89*a*, 89*b* and deliver a burst of compressed air to the barrel(s) causing the stinger(s) 80*a*, 80*b* to be discharged toward the target upon actuation of the trigger switch (not shown) by the user on the handheld remote control unit 24.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

We claim:

1. An unmanned aerial vehicle with non-lethal neuromuscular incapacitation system comprising:
   a body;
   a plurality of rotary assemblies secured to the body and configured to provide lift;
   a control system disposed within said body;
   a stinger assembly mounted on said body and comprising:
      an electrode having a barb at a first end thereof;
      a wire having a first end attached to a second end of the electrode;
      a high voltage pulse power supply attached to a second end of said wire;
      a barrel for holding said barb; and
      a firing mechanism located in said barrel for launching said electrode from the stinger assembly toward a target, and a locking mechanism, said electrode configured for insertion into the barrel into engagement with the firing mechanism, and said locking mechanism releasably engaging said electrode upon actuation of the firing mechanism.

2. The unmanned aerial vehicle according to claim 1, wherein said stinger assembly further comprises a spool about which the wire is removably wound, said spool being rotatably mounted on said unmanned aerial vehicle.

3. The unmanned aerial vehicle according to claim 1, wherein said firing mechanism comprises a spring located in said barrel, said electrode configured for insertion into the barrel into engagement with the spring to compress said spring.

4. The unmanned aerial vehicle accord to claim 3, wherein said firing mechanism further comprises a trigger mechanism attached to said locking mechanism to release a connection between said locking mechanism and said electrode upon actuation.

5. The unmanned aerial vehicle according to claim 3, wherein said firing mechanism further comprises a spool about which the wire is removably wound, said spool being rotatably mounted on the unmanned aerial vehicle.

6. An unmanned aerial vehicle with non-lethal neuromuscular incapacitation system comprising:
   a body;
   a plurality of rotary assemblies secured to the body and configured to provide lift;
   a control system disposed within said body;
   a stinger assembly mounted on said body and comprising:
      an electrode having a barb at a first end thereof;
      a wire having a first end attached to a second end of the electrode:
      a high voltage pulse power supply attached to a second end of said wire; and
      a barrel for holding said barb;
      wherein said firing mechanism comprises an air compressor for delivering a burst of compressed air into a first end of said barrel through a valve disposed between said air compressor and said barrel, and a valve controller for opening and closing said valve.

7. The unmanned aerial vehicle according to claim 6, wherein said firing mechanism further comprises a spool about which the wire is removably wound, said spool being rotatably mounted on the unmanned aerial vehicle.

8. The unmanned aerial vehicle according to claim 7, wherein said stinger assembly further comprises a plurality of barrels, electrodes, wires, spools and valves.

9. An unmanned aerial vehicle with non-lethal neuromuscular incapacitation system comprising:
   a body;
   a plurality of rotary assemblies secured to the body and configured to provide lift;
   a control system disposed within said body;
   a stinger assembly mounted on said body and comprising:
      an electrode having a barb at a first end thereof;
      a wire having a first end attached to a second end of the electrode;
      a high voltage pulse power supply attached to a second end of said wire; and
      a barrel for holding said barb;
      a protective cage attached to said body and surrounding said body and said plurality of rotary assemblies, wherein said protective cage is attached to said body by a plurality of leaf springs.

10. The unmanned aerial vehicle of claim 9, wherein said protective cage is spherically shaped.

11. The unmanned aerial vehicle according to claim 1, wherein said unmanned aerial vehicle includes a plurality of stinger assemblies, each having at least one electrode.

* * * * *